US007181592B2

(12) United States Patent
Pascucci

(10) Patent No.: US 7,181,592 B2
(45) Date of Patent: Feb. 20, 2007

(54) POINTER CIRCUIT

(75) Inventor: Luigi Pascucci, Sesto San Giovanni (IT)

(73) Assignee: STMicroelectronics S.R.L. (IT)

( * ) Notice: Subject to any disclaimer, the term of this patent is extended or adjusted under 35 U.S.C. 154(b) by 345 days.

(21) Appl. No.: 10/245,795

(22) Filed: Sep. 16, 2002

(65) Prior Publication Data

US 2003/0101328 A1 May 29, 2003

(30) Foreign Application Priority Data

Sep. 17, 2001 (EP) ................. 01830591

(51) Int. Cl.
*G06F 12/00* (2006.01)
(52) U.S. Cl. .................................... 711/219
(58) Field of Classification Search ............. 711/219; 714/710
See application file for complete search history.

(56) References Cited

U.S. PATENT DOCUMENTS

| | | | | | |
|---|---|---|---|---|---|
| 4,319,322 | A | * | 3/1982 | Allain et al. ................. | 711/206 |
| 5,111,389 | A | * | 5/1992 | McAuliffe et al. ........... | 711/203 |
| 5,133,061 | A | * | 7/1992 | Melton et al. ............... | 711/128 |
| 5,555,397 | A | * | 9/1996 | Sasama et al. ............... | 711/158 |
| 5,935,258 | A | * | 8/1999 | Klein ............................ | 714/8 |
| 6,021,512 | A | * | 2/2000 | Lattimore et al. ........... | 714/710 |
| 6,151,662 | A | * | 11/2000 | Christie et al. .............. | 711/145 |

FOREIGN PATENT DOCUMENTS

EP    0 361 143 A    4/1990

OTHER PUBLICATIONS

A hardware mechanism for dynamic extraction and relayout of program hot spots Merten, M.C.; Trick, A.R.; Nystrom, E.M.; Barnes, R.D.; Hwu, W.-M.W.; Computer Architecture, 2000. Proceedings of the 27th International Symposium on, Jun. 10-14, 2000 pp. 59-70.*
Low-Power Instruction Bus Encoding for Embedded Processors Petrov, P.; Orailoglu, A.; Very Large Scale Integration (VLSI) Systems, IEEE Transactions on, vol. 12, Issue: 8, Aug. 2004; pp. 812-826.*
EP Search Report 01830591, Feb. 13, 2002.

* cited by examiner

*Primary Examiner*—Brian R. Peugh
(74) *Attorney, Agent, or Firm*—Lisa K. Jorgenson; J. Mark Han; Graybeal Jackson Haley LLP

(57) ABSTRACT

A pointer circuit for pointing to elements in at least one collection of elements comprises a base pointer for providing a first binary-coded value defining a first address of an element in the collection. The pointer circuit also comprises a binary shift circuit receiving the first binary-coded value provided by the base pointer and a second binary-coded value defining a shift value. The binary shift circuit combines the first and second binary-coded values to provide a third binary-coded value defining a second address of an element in the collection differing from the first address by the shift value. A shift-value generator fed by the first binary-coded value generates the second binary-coded value depending on the first binary-coded value, so that a generated shift value takes into account shift values corresponding to first binary-coded values preceding a current first binary-coded value in a prescribed first binary-coded value progression order.

32 Claims, 9 Drawing Sheets

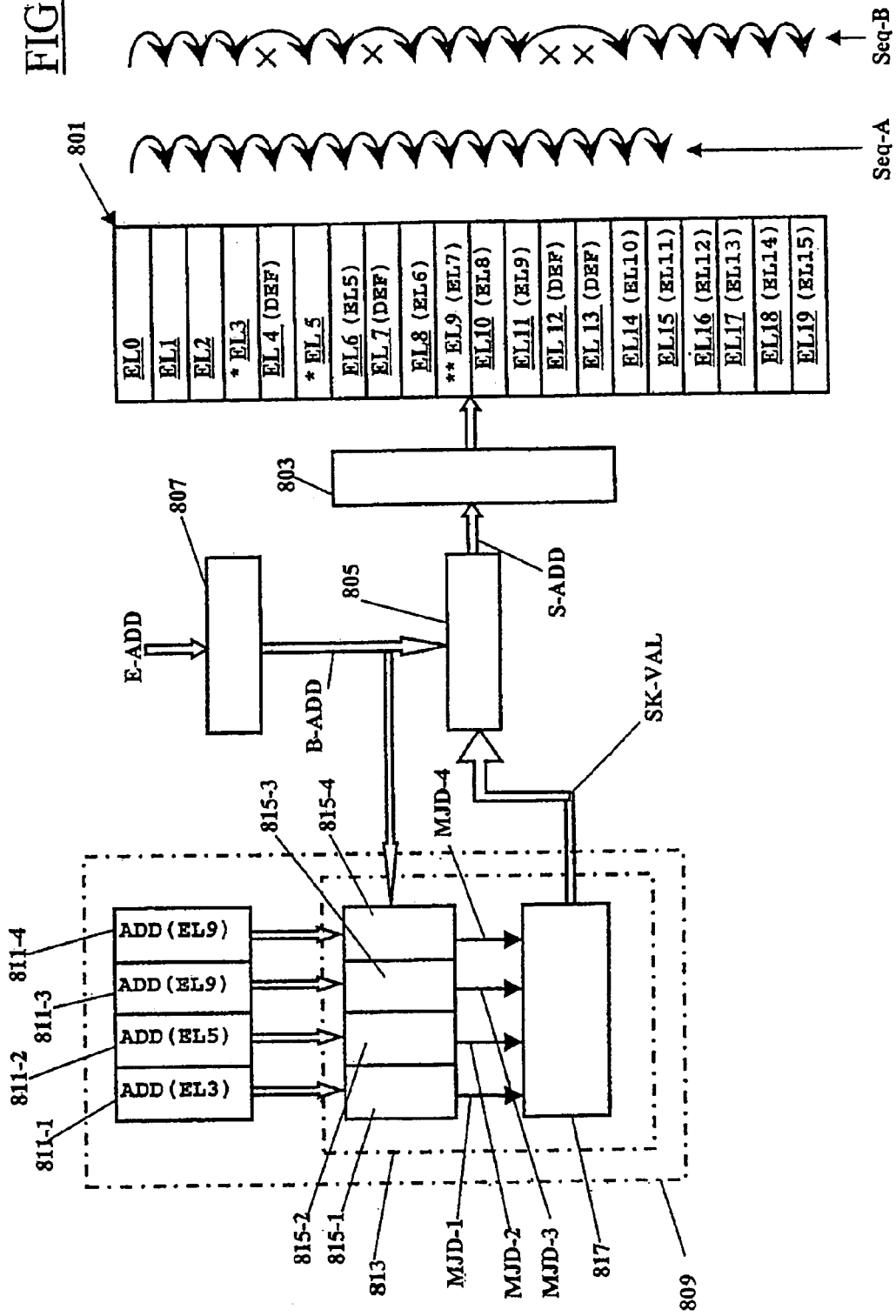

POINTER CIRCUIT

CROSS-REFERENCE TO RELATED APPLICATIONS

The present application claims priority from European patent application no. 01830591.2, filed Sep. 17, 2001, presently pending.

FIELD OF THE INVENTION

The present invention concerns a pointer circuit and a redundancy circuitry architecture for a semiconductor memory exploiting the pointer circuit.

BACKGROUND OF THE INVENTION

A pointer circuit is, in general terms, a circuit adapted to point to, or address, individual elements of any nature in a generic collection of elements. The pointer circuit provides the information necessary to locate the desired element within the elements collection. Such information is provided to selection circuits, associated with the elements collection, which perform the task of selecting the element addressed by the pointer circuit within the elements collection.

Pointer circuits are found in most electronic systems, such as microprocessors, microcontrollers, memories, logic circuits in general, and Application Specific Integrated Circuits (ASICs). For example, in microprocessors and in microcontrollers pointer circuits are used to address memory locations of a Read Only Memory (ROM) in which the instructions to be executed are stored, or to address the locations of a Random Access Memory (RAM). As another example, pointer circuits are used in memories for addressing the memory locations thereof.

A pointer circuit is usually adapted to provide a binary code defining an address of the element, in the elements collection, which, at a given time, needs to be accessed. Pointer circuits are normally associated with binary code decoding circuits which decode the binary code provided by the pointer circuit and accordingly select the desired element corresponding to the specified binary code. The desired element is thus activated, while the remaining elements in the collection are not activated.

In many cases the pointer circuit comprises a binary counter, providing a sequence of binary codes following a binary evolution. In other cases the pointer circuit comprises a register loadable with an externally-supplied binary code defining the address of the element to be selected. The pointer circuit may also include a scrambling circuit.

It frequently happens that a unique pointer circuit is provided for in the electronic system, wherein the pointer circuit is used to address elements in different collections of elements of similar or different natures, belonging to different parts or sub-systems of the electronic system. The binary code provided by the pointer circuit can be used by the different sub-systems of the electronic system for different purposes, such as addressing memory locations for reading or writing data, controlling trimming structures, or scanning a collection of elements. The pointer circuit also often constitutes the synchronization unit and/or reference unit for the whole electronic system.

Some sub-systems of the electronic system may require, for the correct operation thereof, that the address defined by the binary code provided by the pointer circuit is varied, for example for implementing a jump. Since however the pointer circuit is unique for the whole electronic system, the evolution in time thereof cannot be manipulated without affecting the operation of the other sub-systems.

SUMMARY OF THE INVENTION

There is therefore the need of providing a pointer circuit which, albeit unique for a whole electronic system, allows for implementing the possible changes to the evolution in time of the binary codes which can be required by some sub-systems of the electronic system, without affecting the remaining sub-systems.

According to an embodiment of the present invention, there is therefore provided a pointer circuit for pointing to elements in at least one collection of elements. The pointer circuit comprises a base pointer adapted to provide a first binary-coded value defining a first address of an element in the collection. A binary shift circuit receives the first binary-coded value provided by the base pointer and a second binary-coded value defining a shift value, and combines the first and second binary-code values to provide a third binary-coded value defining a second address of an element in the collection differing from the first address by the shift value.

A shift-value generator fed by the first binary-coded value generates the second binary-coded value depending on the first binary-coded value, in such a way that a generated shift value takes into account shift values corresponding to first binary-coded values preceding a current first binary-coded value in a prescribed first binary-coded value progression order.

BRIEF DESCRIPTION OF THE DRAWINGS

The features and advantages of the present invention will be made apparent by the following detailed description of some embodiments thereof, provided solely by way of non-limiting examples, made with reference to the annexed drawings, wherein:

FIG. 8 shows a redundancy circuitry exploiting the pointer circuit according to an embodiment of the present invention.

DETAILED DESCRIPTION OF A PREFERRED EMBODIMENT

Figure 1A:
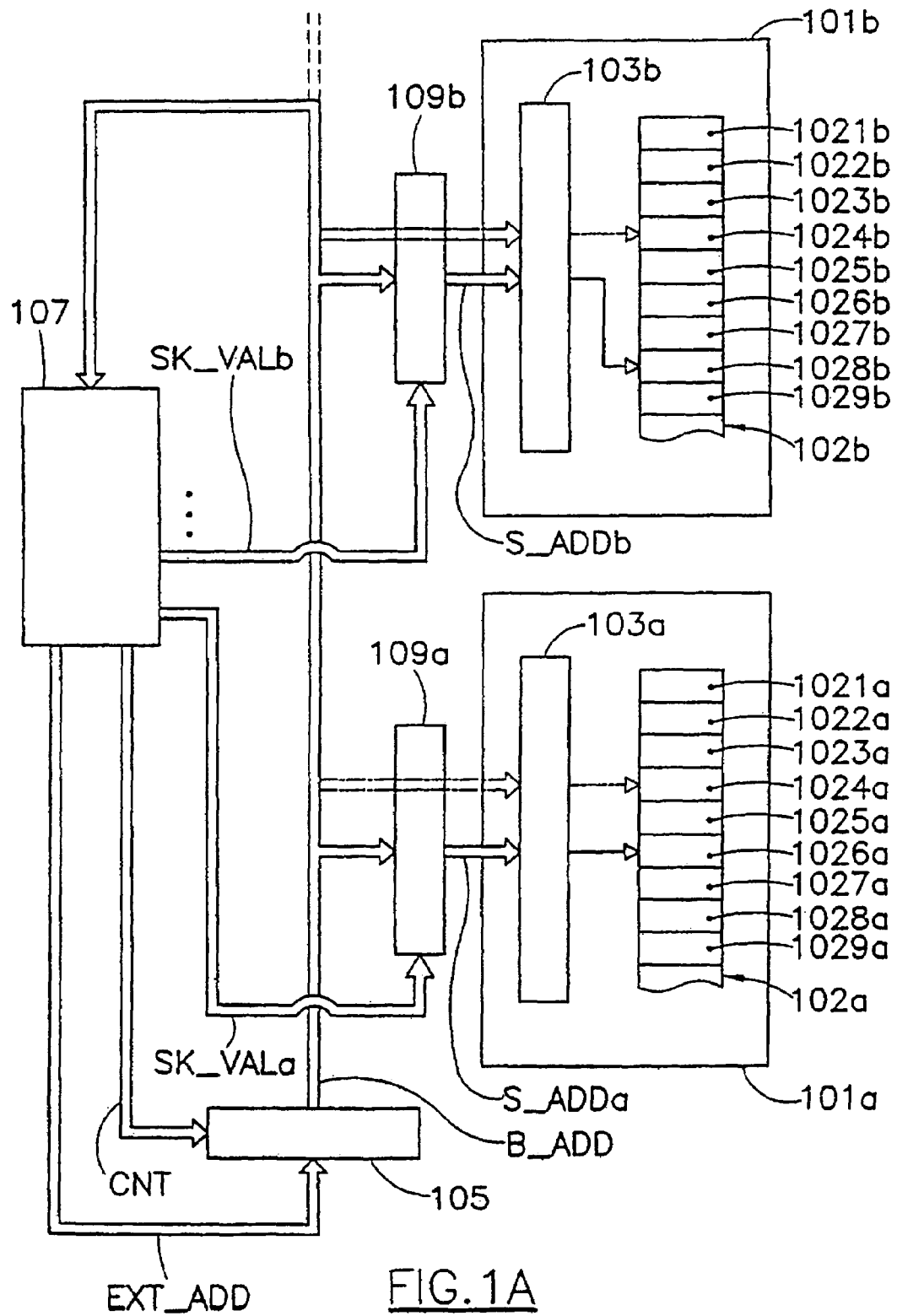
FIG. 1A and FIG. 1B show a schematic block diagram of an electronic system including a pointer circuit according to an embodiment of the present invention.

With reference to FIG. 1A, an electronic system including a pointer circuit according to an embodiment of the present invention is schematically shown in terms of the main building blocks. The electronic system can be for example a microprocessor, a microcontroller, a memory device, a logic circuit, or an ASIC (Application Specific Integrated Circuit). The electronic system comprises in general a plurality of different parts or sub-systems, only two of which are shown for simplicity in the drawing, wherein they are identified by 101a and 101b. For example, assuming that the electronic system is a memory device such as an EPROM or a Flash EEPROM, the two sub-systems 101a, 101b can be two distinct and individually accessible memory banks, each including respective memory locations.

Each sub-system 101a, 101b comprises a respective collection 102a, 102b of elements, only some of which are shown in the drawing for simplicity, wherein they are identified by 1021a–1029a and 1021b–1029b, respectively. The elements 1021a–1029a in the elements collection 102a and the elements 1021b–1029b in the elements collection 102b are individually selectable. For example, assuming that the two sub-systems 101a, 101b are two memory banks of a memory device, each element 1021a–1029a, 1021b–1029b is a memory location of the respective memory bank.

Each element 1021a–1029a, 1021b –1029b in each collection 102a, 102b is univocally identified by a respective address, defined by a binary-coded value (hereinafter simply referred to as binary code). For example, the correspondence between binary codes and elements in the two collections is the following:

| Binary code | Elements |
| --- | --- |
| 00000000 | 1021a, 1021b |
| 00000001 | 1022a, 1022b |
| 00000010 | 1023a, 1023b |
| 00000011 | 1024a, 1024b |
| 00000100 | 1025a, 1025b |
| 00000101 | 1026a, 1026b |
| 00000110 | 1027a, 1027b |
| 00000111 | 1028a, 1028b |
| 00001000 | 1029a, 1029b |
| and so on. | |

In order to select one specific element in each elements collection, a decoder circuit 103a, 103b is associated with each elements collection. The decoder circuit 103a, 103b receives a binary code S_ADDa, S_ADDb defining an address of an element in the collection which, at a given time, needs to be selected, decodes the binary code, and accordingly selects the element identified by the received binary code. For example, as shown schematically in the drawing, the binary code S_ADDa supplied to the decoder circuit 103a in the sub-system 101a defines the address of the element 1026a in the elements collection 102a, while the binary code S_ADDb supplied to the decoder circuit 103b in the sub-system 101b defines the address of the element 1028b in the elements collection 102b.

The electronic system comprises a base pointer 105 generating a base binary code B_ADD defining a base address. The base binary code B_ADD is commonly supplied to all or at least a group of sub-systems of the electronic system. In particular, the base binary code B_ADD is supplied to the two sub-systems 101a, 101 b for purposes of selection of specified elements in the respective elements collections 102a, 102b. Referring again to the example of the two sub-systems 101a, 101b as being two memory banks of a memory device, the base binary code B_ADD generated by the base pointer 105 is intended to be used in each memory bank to select one particular memory location thereof.

The base pointer 105 can for example be implemented by means of a register into which an external binary code EXT_ADD defining a base address to be supplied to the sub-systems 101a, 101b can be loaded under the control of a control sub-system 107, which controls the base pointer 105 by means of control signals CNT. Alternatively, the base pointer 105 is a binary counter which, under the control of the control sub-system 107, can be cleared (i.e., reset to zero) or loaded with the external binary code EXT_ADD, or can count up or down starting from a previously loaded external address or from zero with a binary evolution. A scrambling structure may also be associated with the register or the binary counter.

If the base binary code B_ADD generated by the base pointer 105 were supplied directly to the decoder circuits 103a, 103b of the different sub-systems 101a, 101b, as schematically represented in dash-and-dot lines in FIG. 1A, the elements selected in the collections 102a, 102b would be determined only on the basis of the value of the base binary code B_ADD. For example, according to the correspondence specified previously, for a base binary code B_ADD equal to 00000011 the selection of the fourth element 1024a in the collection 102a would necessarily be accompanied by the selection of the fourth element 1024b in the collection 102b. This would make the electronic system quite inflexible and capable of performing only a limited set of tasks.

In order to provide the pointer circuit with a greater flexibility according to an embodiment of the present invention, binary shift circuits 109a, 109b are provided downstream from the base pointer 105. The binary shift circuits 109a, 109b are each associated with a respective sub-system 101a, 101b. Each binary shift circuit 109a, 109b receives the base binary code B_ADD generated by the base pointer 105, applies a prescribed binary shift to the current value of the base binary code B_ADD, and feeds the decoder circuit 103a, 103b of the associated sub-system 101a, 101b with a secondary binary code S_ADDa, S_ADDb. The decoder circuits 103a, 103b decodes the respective secondary binary code S_ADDa, S_ADDb and accordingly select the element in the associated collection 102a, 102b which corresponds to the secondary binary code S_ADDa, S_ADDb.

The binary shift circuits 109a, 109b operate under the control of the control sub-system 107. In particular, the control sub-system 107 communicates to each binary shift circuit 109a, 109b, in terms of a binary-coded value, a value of the shift to be applied to the current base binary code B_ADD. The value of the shift is communicated to the binary shift circuits in the form of a respective shift binary code SK_VALa, SK_VALb.

Figure 1B:
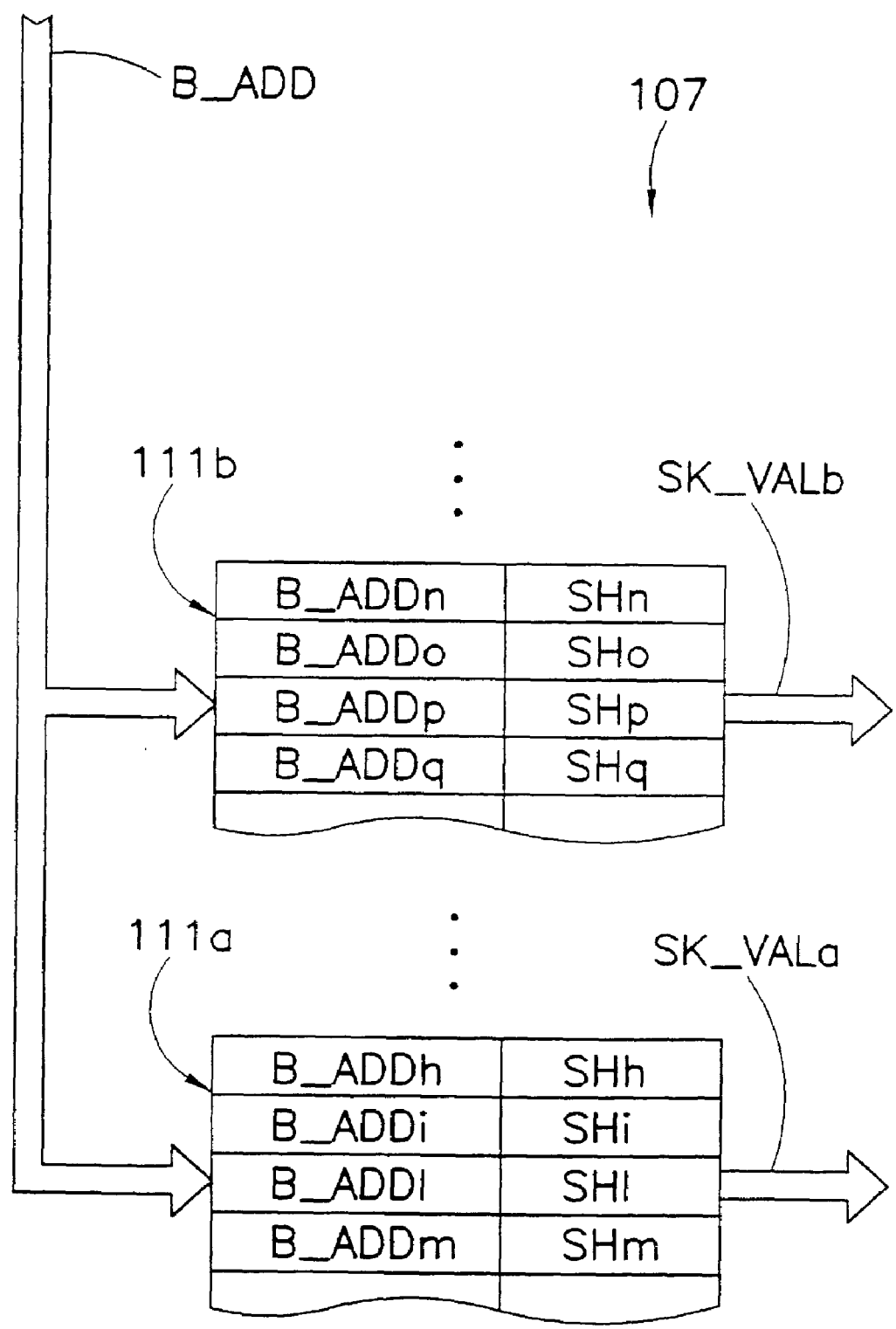

With reference to FIG. 1B, the control sub-system 107 includes for example for each binary shift circuit 109a, 109b a respective table 111a, 111b. In each table 111a, 111b specific values of the base binary code B_ADD are stored, together with corresponding values of the shift to be applied by the binary shift circuits, for example in the form of binary-coded values.

For example, the first table 111a stores base binary code values B_ADDh, B_ADDi, B_ADDl, B_ADDm and corresponding binary-coded shift values SHh, SHi, SHl, SHm; the second table 111b stores base binary code values B_ADDn, B_ADDo, B_ADDp, B_ADDq and corresponding binary-coded shift values SHn, SHo, SHp, SHq. The base binary code values stored in the tables 111a, 111b define the extremes of base binary code intervals for which binary shifts are to be applied to the base binary code.

The control sub-system 107 is adapted to perform a comparison of the current base binary code B_ADD with the base binary code values stored in the tables 111a, 111b. For example, referring to the first table 111a, if the current base binary code B_ADD is lower than the lowest binary code value B_ADDh stored in the first table 111a, no shift is to be applied to the current base binary code, and the value of the binary shift SK_VALa supplied to the binary shift circuit 109a is zero. If instead the current base binary code B_ADD is equal to or greater than the first, lowest binary code value B_ADDh, but lower than the second base binary code value B_ADDi, a binary shift of value SHi is to be applied to the base binary code and the value of the binary shift SK_VALa supplied to the shift circuit 109a is equal to SHi. If the current base binary code B_ADD is equal to or greater than the second base binary code value B_ADDi but lower than the third base binary code value B_ADDl, a binary shift of value SHi is to be applied to the base binary code and the value of the binary shift SK_VALa supplied to the shift circuit 109a is equal to SHi. Similarly, a binary shift of value equal to SHl is applied to base binary codes between the values B_ADDl and B_ADDm, a binary shift of value equal to SHm is applied to base binary codes between the value B_ADDm and the next higher base binary code value, and so on. A similar operation is carried out in parallel to the former one on the second table 111b.

Thus, the decoder circuits 103a, 103b receive the secondary code S_ADDa, S_ADDb which is the base binary code B_ADD shifted by the binary shift value specified by the control sub-system 107. In this way, albeit the base binary code B_ADD generated by the base pointer 105 is unique for the whole electronic system, it is possible to implement local shifts in the selection of elements within each collection of elements 102a, 102b. For example, by specifying suitable shift values, it possible to have the unique base binary code B_ADD=00000011 lead to the selection of the sixth element 1026a in the collection 102a of the first sub-system 101a and of the eighth element 1028b in the collection 102b of the second sub-system 101b. In general, the secondary binary code S_ADDa, S_ADDb furnished by the binary shift circuits 109a, 109b typically will point to an element in the respective collection 102a, 102b different from the element which would be otherwise pointed to by the base binary code B_ADD. This allows in particular to implement local jumps in the regular succession of the elements.

The base binary code values and the corresponding shift binary code values stored in the control sub-system 107 can be determined once and for all in the design phase of the electronic system and be permanently stored during the manufacturing of the electronic system. Alternatively, the control sub-system can be programmable, so as to allow changes to the base binary code values and the corresponding shift binary code values during the electronic system life.

Figure 2:
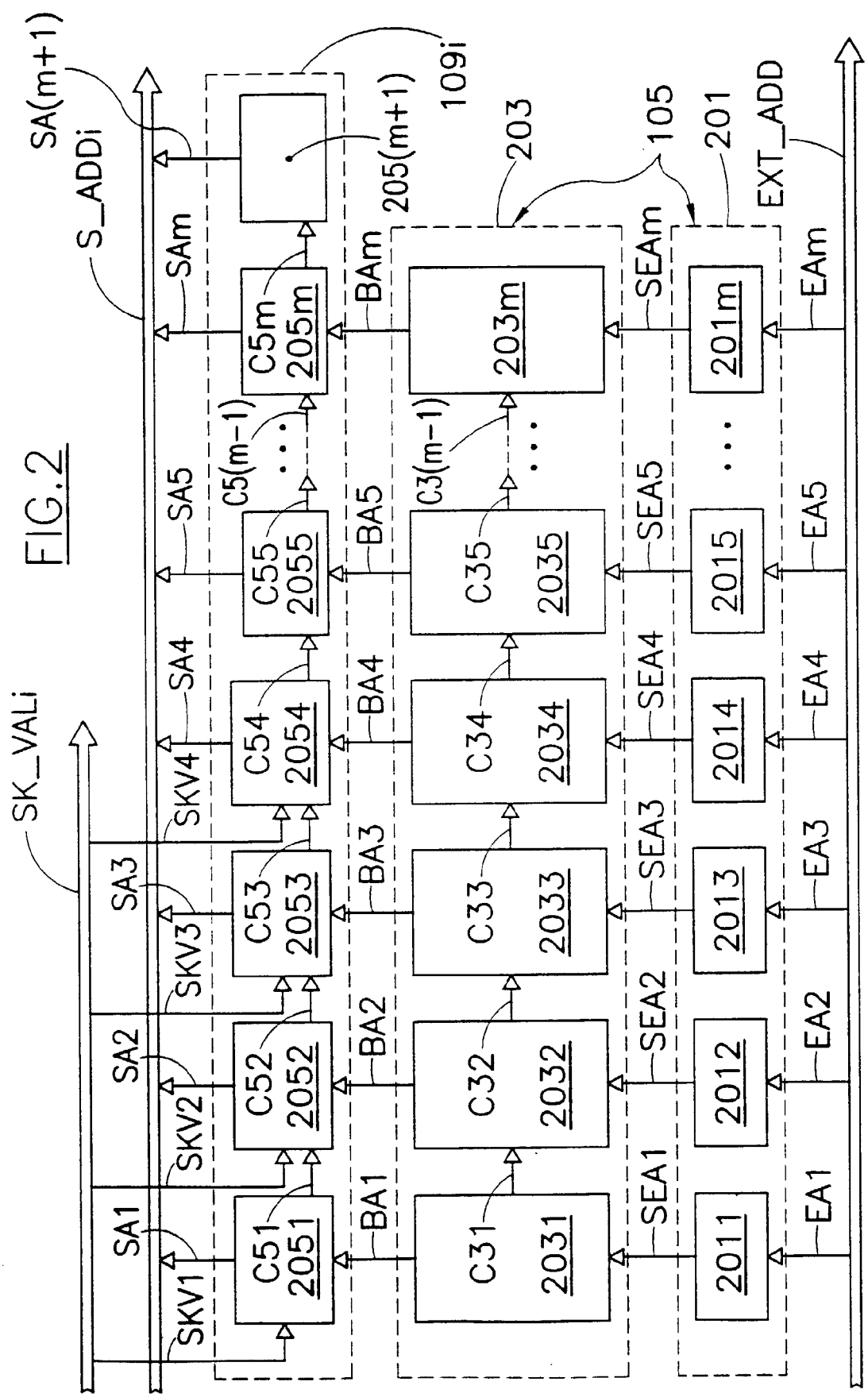
FIG. 2 is a more detailed block diagram of the pointer circuit of FIG. 1A, in a preferred embodiment of the present invention.

Reference is now made to FIG. 2, showing in greater detail the structure of the base pointer 105 and of a generic one 109i of the binary shift circuits 109a, 109b, associated with the different sub-systems 101a, 101b, in a preferred embodiment of the present invention.

The base pointer 105 comprises a binary counter 203 having a plurality of m counter stages 2031–203m. The number of counter stages defines the dimension, i.e. the number of bits, of the base binary code B_ADD. Each counter stage 2032–203m is fed by the immediately previous counter stage with a carry signal C31–C3(m−1). The first counter stage 2031 is instead not fed with carry signals.

Each counter stage 2031–203m is fed by a respective line EA1–EAm of the external binary code EXT_ADD, so that the base pointer 105 can be loaded with an externally supplied starting binary code. Preferably, the external-binary-code signal lines EA1–EAm do not feed the respective counter stages directly, but through respective bistable circuits 2011–201m having the function of sampling the logic state of the external binary code signal lines EA1–EAm when the control sub-system 107 determines that the base pointer 105 is to be loaded with an externally supplied binary code, and of holding the sampled state so that the load inputs of the counter stages are constantly fed with the sampled logic state SEA1–SEAm even if the external binary code EXT_ADD changes.

Each counter stage 2031–203m has an output BA1–BAm. The outputs BA1–BAm form, altogether, the base binary code B_ADD.

The binary shift circuit 109i comprises a plurality of (m+1) stages 2051–205(m+1), that is a number of stages equal to the number of counter stages plus one. The first m stages 2051–205m are each one associated with a respective counter stage 2031–203m and receive the respective output BA1–BAm thereof. Each stage 2052–205(m+1) receives from the immediately previous stage a carry signal C51–C5m.

The first stages of the binary shift circuit 109i, associated with the least significant counter stages (i.e. the counter stages providing the least significant bits of the base binary code B_ADD) additionally receive the shift binary code SK_VALi (with i=a, b) supplied by the control sub-system 107, specifying the shift to be applied to the base binary code B_ADD. In the shown example, the shift binary code is a four-bit binary code. Each one of the first four stages 2051–2054 of the binary shift circuit 109i receives a respective bit SKV1–SKV4 of the binary code representing the shift binary code value to be applied, where the bit SKV1 is the least significant bit of the shift binary code. In general, the shift binary code can be a binary code with a number of bits ranging from one bit (corresponding to a maximum applicable shift value equal to one) to m, (corresponding to a maximum applicable shift value equal to $2^m-1$).

Each stage 2051–205(m+1) has an output SA1–SA(m+1). The outputs SA1–SA(m+1) form, altogether, the secondary binary code S_ADDi, which is fed to the respective decoder circuit 103a, 103b. The secondary binary code has a number of bits equal to the number of bits of the base binary code plus one. This means that the number of elements in the respective elements collection that can be individually addressed by the secondary binary code is higher than the number of elements that would be individually addressed by the base binary code. The elements collections can thus include a number of elements higher than the number allowed by the base binary code.

The first four stages 2051–2054 of the binary shift circuit 109i perform the function of a four-bit parallel binary adder, allowing a binary addition of a binary code carried by the first four output lines BA1–BA4 of the base pointer and of the binary shift value SK_VAL. The remaining stages 2055–205m of the binary shift circuit 109i implement a correct propagation of the carry resulting from the binary addition. The last stage 205(m+1) of the binary shift circuit 109i allows a proper driving of the $(m+1)^{th}$ line of the secondary binary code S_ADDi; this stage could in principle not be provided, and the $(m+1)^{th}$ line of the secondary binary code could be driven directly by the output carry C5m of the stage 205m.

From another viewpoint, the binary shift circuit 109i can be viewed as an m-bit parallel binary adder, in which one of the two addends of each of the last stages 2055–205m is set to zero.

Figure 3:
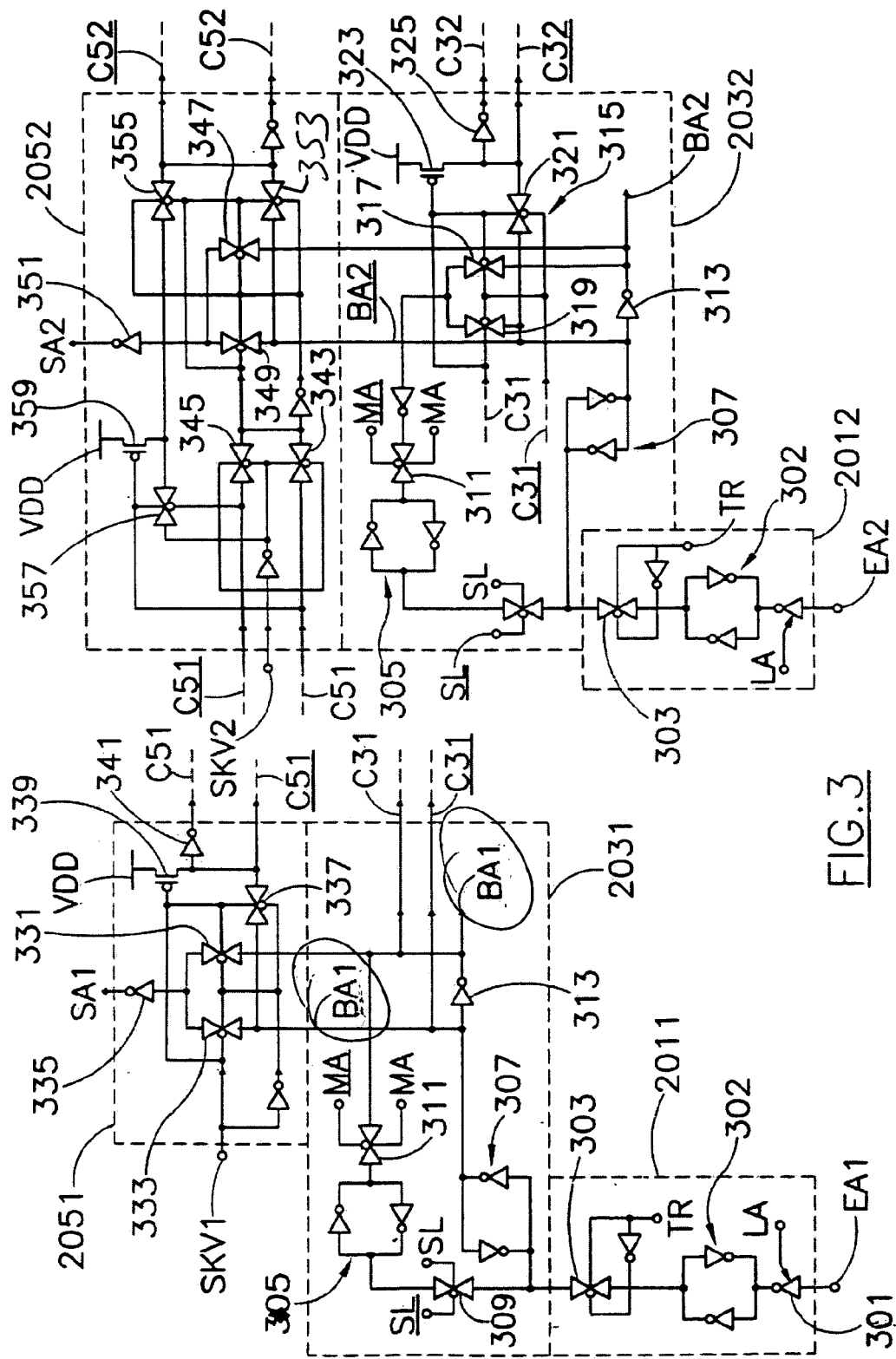
FIG. 3 is a circuit diagram of the first two stages of the pointer circuit of FIG. 2.
Figure 4:
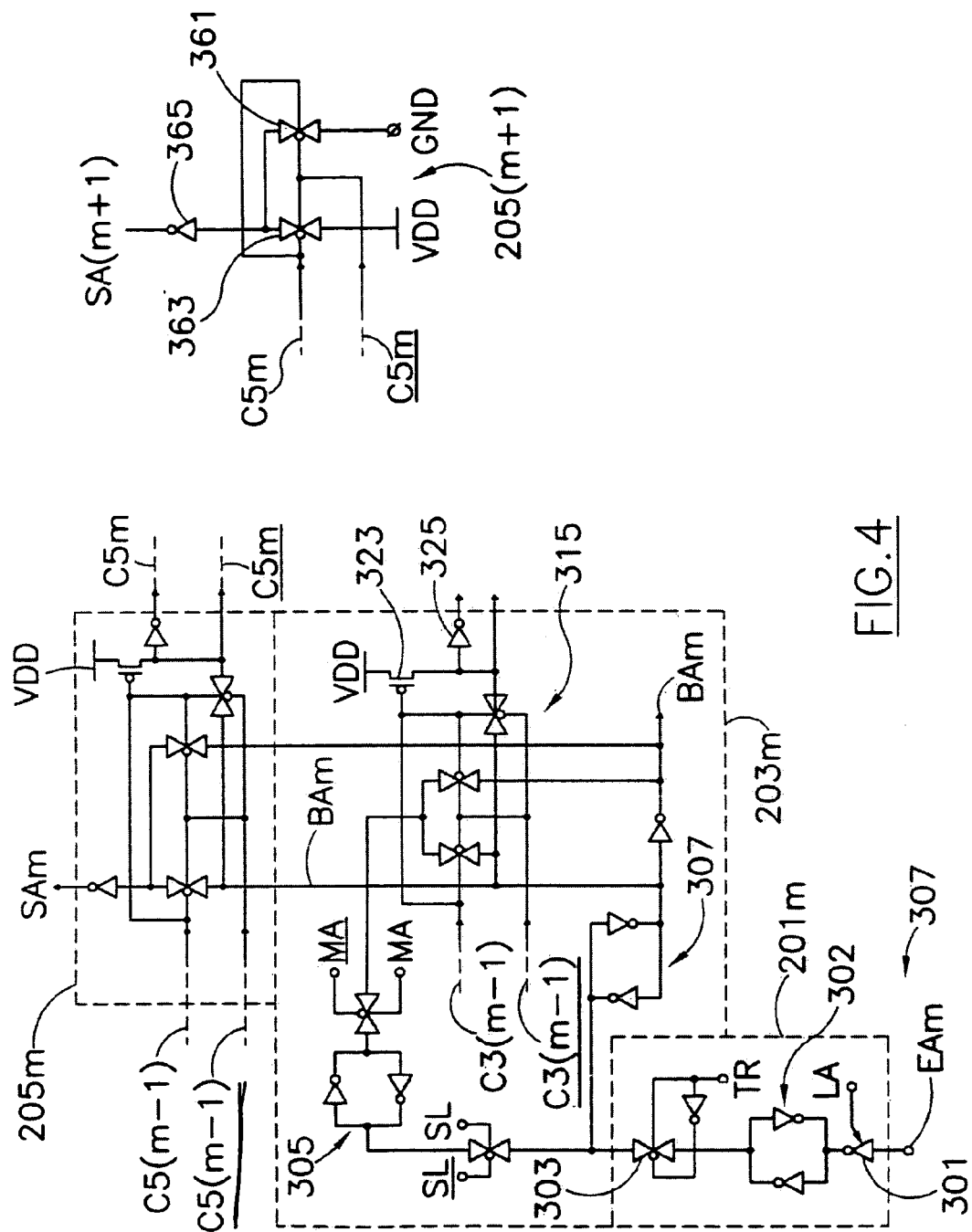
FIG. 4 is a circuit diagram of the last two stages of the pointer circuit of FIG. 2.

FIG. 3 is a detailed circuit diagram of the first two stages 2031, 2032 of the base pointer 105 and of the associated stages 2051, 2052 of the binary shift circuit 109i. FIG. 4 is instead a detailed circuit diagram of the last stage 203m of the base pointer and of the last two stages 205m, 205(m+1) of the binary shift circuit. The circuits depicted in FIGS. 3 and 4 refer merely to a preferred embodiment of the present invention and are not to be considered limitative for the present invention.

Referring to FIGS. 2, 3, and 4, all the sample and hold circuits 2011–201m are structurally identical to each other, and comprise a tristate inverting buffer 301 receiving the respective external binary code signal line EA1–EAm. The tristate inverting buffer 301, which is controlled by a latch control signal LA, feeds a latch 302 intended to sample and store the logic state present on the respective external binary code signal line EA1–EAm when the buffer 301 is enabled by the latch signal LA. Downstream of the latch 302, a transfer gate 303 selectively activatable by a transfer control signal TR allows transfer of the content of the latch 302 to the respective stage 2031–203m of the base pointer. The signals LA and TR are for example generated under the control of the control sub-system 107 and are properly timed, so that when an external binary code is to be loaded into the base pointer, the latch signal LA is asserted first, to enable the latching of the external address by the latches 302. Then the latch signal LA is deasserted, to isolate the latches 302 from the external binary code signal lines EA1–EAm, and the transfer signal TR is asserted to cause the logic state stored in the latches 302 to be transferred through the transfer gates 303 to the base pointer stages 2031–203m to be loaded therein.

Each one of the stages 2031–203m of the base pointer 105 comprises a master-slave double latch structure, with a master latch 305 and a slave latch 307. The slave latch 307 has an input connected, through a transfer gate 309 controlled by a slave signal SL (and the complement thereof SL) generated under the control of the control sub-system 107, to an output of the master latch 305. An output of the slave latch 307 represents a logic complement BA1–BAm of the output BA1–BAm of the stage. An inverter 313 provides the output BA1–BAm.

The first stage 2031 differs from the remaining stages 2032–203m of the base pointer for the fact of not including a carry addition network, since there is no carry from previous stages to be taken into account. In the first stage 2031, an input of the master latch 305 is coupled, through a transfer gate 311 controlled by master signal MA (and the complement thereof MA) generated under the control of the control sub-system 107 to the output BA1 of the stage. The output BA1 of the stage and the complement BA1 thereof form the carry signal C31 and a complement thereof C31, which are fed to the second stage 2032.

In all the other stages 2032–203m a carry addition network 315 is provided. The carry signal coming from the adjacent previous stage and the logic complement thereof, for example the signals C31 and C31 shown in FIG. 3, control a pair of transfer gates 317, 319. The two transfer gates 317, 319 have a respective input connected to the output BA2–BAm of the stage and, respectively, to the logic complement thereof BA2–BAm, and an output connected through an inverter to an input of the transfer gate 311. According to the state of the carry signal, either one or the other of the transfer gates 317, 319 is activated. When the carry signal coming from the previous stage is a logic "0" (no carry), the transfer gate 319 is open (no transfer) while the transfer gate 317 is closed (transfer enabled). The output BA2–BAm of the stage is thus transferred to the master latch 305. When instead the carry signal coming from the previous stage is a logic "1", the transfer gates 317 and 319 are respectively open and closed, enabling the transfer to the master latch 305 of the logic complement BA2–BAm of the stage output signal. For the generation of the carry signal to be fed to the next adjacent base pointer stage 2033–203m a transfer gate 321 is provided, controlled by the carry signal coming from the previous adjacent stage (and by the logic complement thereof); the transfer gate 321 has an input connected to the logic complement BA2–BAm of the output of the base pointer stage, and an output connected to an inverter 325 whose output forms the carry signal for the next adjacent stage. Additionally, a pull-up transistor 323, controlled by the carry signal coming from the previous stage, is connected between the output of the transfer gate 321 and a supply voltage VDD (for example carried by a 5 V voltage rail). Referring for example to the second stage 2032, when the carry signal C31 coming from the first stage 3031 is a logic "0" (which means that there will be no carry originating from this stage) the transfer gate 321 is closed and the pull-up transistor 323 is turned on thus pulling the input of the inverter 325 to the voltage supply VDD, so that the carry signal C32 is a logic "0". If differently the carry signal C31 coming from the first stage 2031 is a logic "1", the pull-up transistor 323 is off and the transfer gate 321 is open: the logic state of the carry signal C32 will thus be the logic complement of the state of signal BA2, i.e. the same logic state as the stage output signal BA2.

Figure 5:
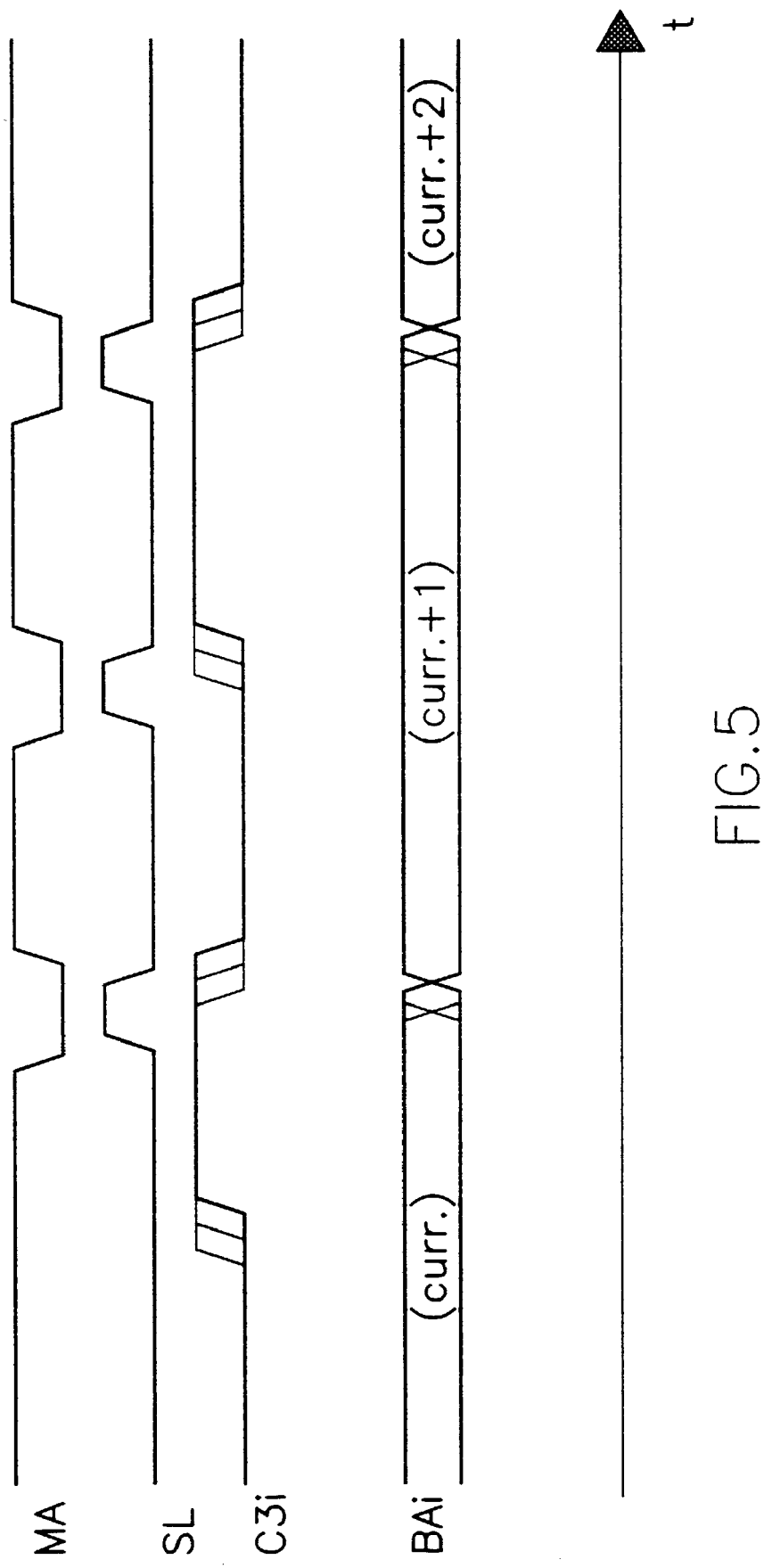
FIG. 5 is a time diagram of some signals of the circuit shown in FIGS. 3 and 4.

FIG. 5 shows the timing of the master and slave control signals MA, SL, of the carry signal C3i and of the output signal BAi of a generic counter stage.

Referring again to FIGS. 2, 3, and 4, the stages 2051–205m of the binary shift circuit 109i are of three different kinds. The first stage 2051 must be capable of performing the binary addition of the output of the respective base pointer stage 2031 with the first bit SKV1 of the shift binary code defining the shift value SK_VAL, without having to handle any carry from the previous stages. The stages 2052–2054 must be capable of performing a similar binary addition, but taking into account the carry C51–C53 coming from the previous adjacent stage. Finally, the stages 2055–205m must be capable of performing a binary addition of the output of the respective base pointer stage 2035–203m with the carry coming from the previous adjacent stage.

Considering the first stage 2051, a pair of transfer gates 331, 333 is provided, controlled by the first bit SKV1 of the binary code SK_VAL (and by a logic complement thereof). The two transfer gates 331, 333 have respective inputs connected to the output signal BA1 of the first base pointer stage and to the complement thereof BA1, respectively. The outputs of the transfer gates 331, 333 are tied together and supply an inverter 335, the output of which forms in turn the output signal SA1 of the secondary binary code S_ADD. For the generation of the carry signal C51 (and of the logic complement thereof C51) a circuit structure identical to that included in the base pointer stages 2032–203m for generating the respective carry signals is provided for. A transfer gate 337, controlled by signal SKV1 and by the logic complement thereof, has an input connected to the complemented output signal BA1 of the associated base pointer stage. A pull-up transistor 339, controlled by the signal SKV1, is connected between the voltage supply VDD and the output of the transfer gate 337. An inverter 341 connected to the output of the transfer gate 337 provides the carry signal C51. The stages 2055–205m have a structure substantially identical to that of the first stage 2051, except for the fact that the signal SKV1 is replaced by the carry signal C54–C5(m–1) coming from the respective adjacent previous stage.

Each one of the stages 2052–2054 comprises a first pair of transfer gates 343, 345 controlled by the respective signal SKV2–SKV4 and by a logic complement thereof. The transfer gate 343 is fed with the carry signal C51–C53 coming from the previous adjacent stage, while the transfer gate 345 is fed with the logic complement thereof (such as the logic complement C51 of the carry signal C51 coming from the first stage). The outputs of the transfer gates 343, 345 are tied together and control a second pair of transfer gates 347, 349, with respective inputs connected to the output signal BA2–BA4 of the associated base pointer stage and, respectively, to the complement thereof BA2–BA4. The outputs of the transfer gates 347, 349 are tied together to form an input for an inverter 351, an output of which forms in turn the output signal SA2–SA4 of the stage. In order to generate the carry signal for the next adjacent stage, a third pair of transfer gates 353, 355 are provided. Transfer gate 353, which is controlled by the output of the first pair of transfer gates 343, 345, is fed with the logic complement BA2–BA4 of the output of the associated base pointer stage. Transfer gate 355, also controlled by the output of the first pair of transfer gates, is fed with an output signal of a further transfer gate 357 controlled by the carry signal C51–C53 (and the logic complement thereof) coming from the previous adjacent stage and in turn supplied with a logic complement of the signal SKV2–SKV4. A pull-up transistor 359 controlled by the carry signal C51–C53 is additionally connected between the output of the transfer gate 357 and the voltage supply VDD. The carry signal C52–C54 to be fed to the next adjacent stage is derived from the short-circuited outputs of the transfer gates 353, 355 through an inverter.

Referring to FIG. 4, the last stage 205(m–1) of the binary shift circuit 109i comprises two transfer gates 361, 363, controlled by the carry signal C5m, and the logic complement C5m thereof, coming from the stage 205m. The transfer gate 361, which is closed when the carry signal C5m is a logic "1", has an input connected to a reference voltage rail (ground) GND. The transfer gate 363, closed when the carry signal C5m is a logic "0", has an input connected to the supply voltage rail VDD. The outputs of the transfer gates 361, 363 are tied together and supplied to an input of an inverter 365, which drives the line SA(m+1) of the secondary binary code.

Figure 6:
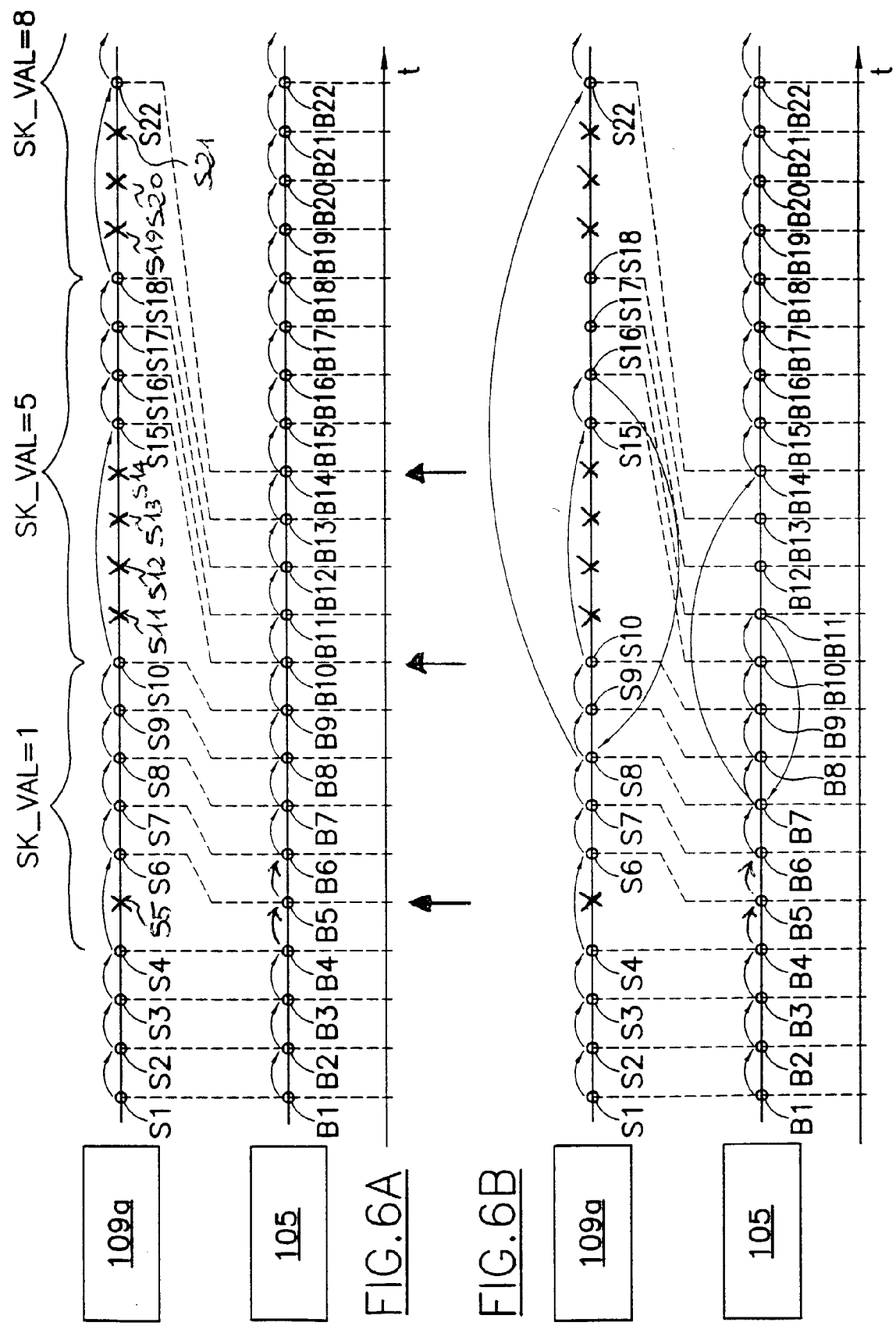
FIGS. 6A and 6B are two diagrams illustrating the operation of the pointer circuit according to an embodiment of the present invention.

The operation of the pointer circuit will be now described making reference to FIGS. 6A and 6B.

Referring firstly to FIG. 6A, it is assumed that the base pointer 105 is initially loaded with the starting base binary code B1, for example "00000000"; the base pointer 105 then evolves sequentially scanning all the following base binary codes B2 to B22 in a regular, binary progression, that is:

"00000000"→"00000001"→"00000010"→"00000011"→ "00000100"→"00000101" . . . .

It is also assumed that three binary shifts of respective values (expressed in decimal base) 1, 5 and 8 are to be applied by the binary shift circuit 109a in correspondence of the base binary codes B5 ("00000101"), B10 ("00001010") and B14 ("00001110"), respectively (indicated by arrows in FIG. 6A). The progression of the secondary binary code S_ADDa follows that of the base binary code up to the base binary code B4, the shift binary code SK_VALa being equal to zero. When the base pointer reaches the binary code B5, the control sub-system 107 feeds the binary shift circuit 109a with a shift binary code equal to "0001" (1 in decimal base), so that the binary code S5 ("000000101") is skipped and the secondary binary code following S4 ("000000100") is S6 ("000000110") instead of S5 ("000000101"). The progression of the secondary binary code then proceeds with an offset of one with respect to the base binary code up to the base binary code B10. When the base pointer reaches this value, the control sub-system 107 feeds the binary shift circuit 109a with a shift binary code equal to "0101" (5 in decimal base), so that the secondary binary codes S11, S12, S13 and S14 are skipped and the following secondary binary code is S15 ("000001111"). The progression of the secondary binary code then proceeds with an offset of five with respect to the base binary code up to the base binary code B14. The control sub-system 107 now feeds the binary shift circuit 109a with a shift binary code equal to "1000" (8 in decimal base), so that the secondary binary codes S19, S20 and S21 are skipped and the following secondary binary code is S22 ("000010110"). The skipped second binary codes S5, S11, S12, S13, S14, S19, S20 and S21 are indicated by a cross in FIG. 6A.

It can be appreciated that the shift binary codes supplied by the control sub-system 107 to the binary shift circuit 109a are cumulative, and takes into account previous shifts applied to the base binary code for values thereof that precede a current base binary code value in a generic order of base binary code values (in this example, an increasing order). In other words, the pointer circuit keeps memory of the shifts already applied. Referring to the shown example, in order to skip the four binary codes S81 to S14, a shift equal to 5 is applied to the base binary code, because the previous shift of 1 is taken into account; similarly, in order to skip the three binary codes S19 to S21, a shift equal to 8 is applied to the base binary code, taking into accounts the previous cumulative shift of 5 applied to the base binary code.

FIG. 6B illustrates the operation of the pointer circuit in the case that, after one or more binary shifts have been applied, the base pointer 105 is loaded with external binary code values modifying the regular progression of FIG. 6A. As before, it is assumed that shift values equal to 1, 5 and 8 (in decimal base) are respectively associated with the base binary codes B5, B10 and B14. The operation is the same up to the base binary code B11, to which there corresponds a secondary binary code S16. Let it be assumed that at this point the base pointer 105 is loaded with an external binary code causing a jump back to base binary code B7, that is, four positions back in the regular progression. The control sub-system 107, recognizing that the base binary code B7 is higher than the base binary code B5 for which a shift value of 1 is specified, feeds the binary shift circuit 109a with a shift binary code "0001", which causes the secondary binary code to be equal to S8. Thus, the secondary binary code jumps back four positions in the progression thereof. Assuming now that the base pointer 105 is loaded with an external binary code causing a jump forward to the base binary code B14, the control sub-system 107 recognizes that for this base binary code a shift equal to 8 (in decimal base) is to be applied and feeds the binary shift circuit 109a with the shift binary code "1000". This causes the secondary binary code to jump to S22, that is, seven positions forward in the progression thereof.

Embodiments of the present invention propose a pointer circuit particularly adapted to be used in electronic systems with a plurality of sub-systems, each sub-system including one or more generic collections of elements of any nature which need to be individually selectable. Thanks to these embodiments, the need of individually selecting elements in the generic collection of elements of the different sub-systems that make up the electronic system can be satisfied by providing a single base pointer, unique for the whole electronic system, having a natural binary evolution. According to the specific needs of the different sub-systems, differentiated local changes with respect to the natural binary evolution of the base pointer can be implemented, such as local shifts, so as to feed each sub-system with addresses pointing to the desired elements in the respective collections, without being restricted to the selection of the elements pointed by the address provided by the base pointer and, at the same time, without affecting the natural binary evolution of the base pointer itself, which can still be used as a synchronization and reference element for the whole electronic system, and without affecting the behaviour of the remaining sub-systems.

Embodiments of the invention can be applied to generic electronic systems including sub-systems of any nature, such as non-volatile memories and RAMs. The sub-systems may also include local pointer circuits, for example local counters, operating on the basis of the base binary code provided by the base pointer, if necessary modified by a binary shift circuit.

Thanks to embodiments of the present invention, the local changes to the base binary code provided by the base pointer do not alter the binary nature of the secondary addresses, so that it is not necessary to modify the circuits of the various sub-systems which are fed by the secondary addresses.

Additionally, embodiments of the present invention preserve the one-to-one correspondence between the elements in a generic elements collection and the respective addresses defined by the secondary binary code furnished by the associated binary shift circuit.

It is observed that it is not strictly necessary that each sub-system of the electronic system have an associated binary shift circuit. Some sub-systems could in fact be fed directly by the base binary code generated by the base pointer, where no local changes to the binary progression of the base binary code are envisaged. Also, a same binary shift circuit could be associated with a two or more sub-systems of the electronic system, where the two or more sub-systems require same local changes to the binary progression of the base binary code.

Also, although in the previous description the binary shift circuits are adapted to perform binary additions, this is not to be intended as a limitation of the invention. Binary shift circuits capable of performing also binary subtractions could in fact be used. In this case, one bit of the shift binary code can be used to specify the sign of the shift to be applied.

In particular, the pointer circuit can be exploited in the context of a redundancy circuitry for a semiconductor memory.

The redundancy circuitry allows functionally replacing defective memory elements with redundant elements. The memory elements that can normally be functionally replaced are entire lines of the memory cell matrix, that is, memory cell rows or columns; the redundancy circuitry allows functionally replacing defective memory cell rows or columns with additional memory cell rows (word lines) or columns (bit lines), which are accessed instead of the defective elements.

Figure 7:
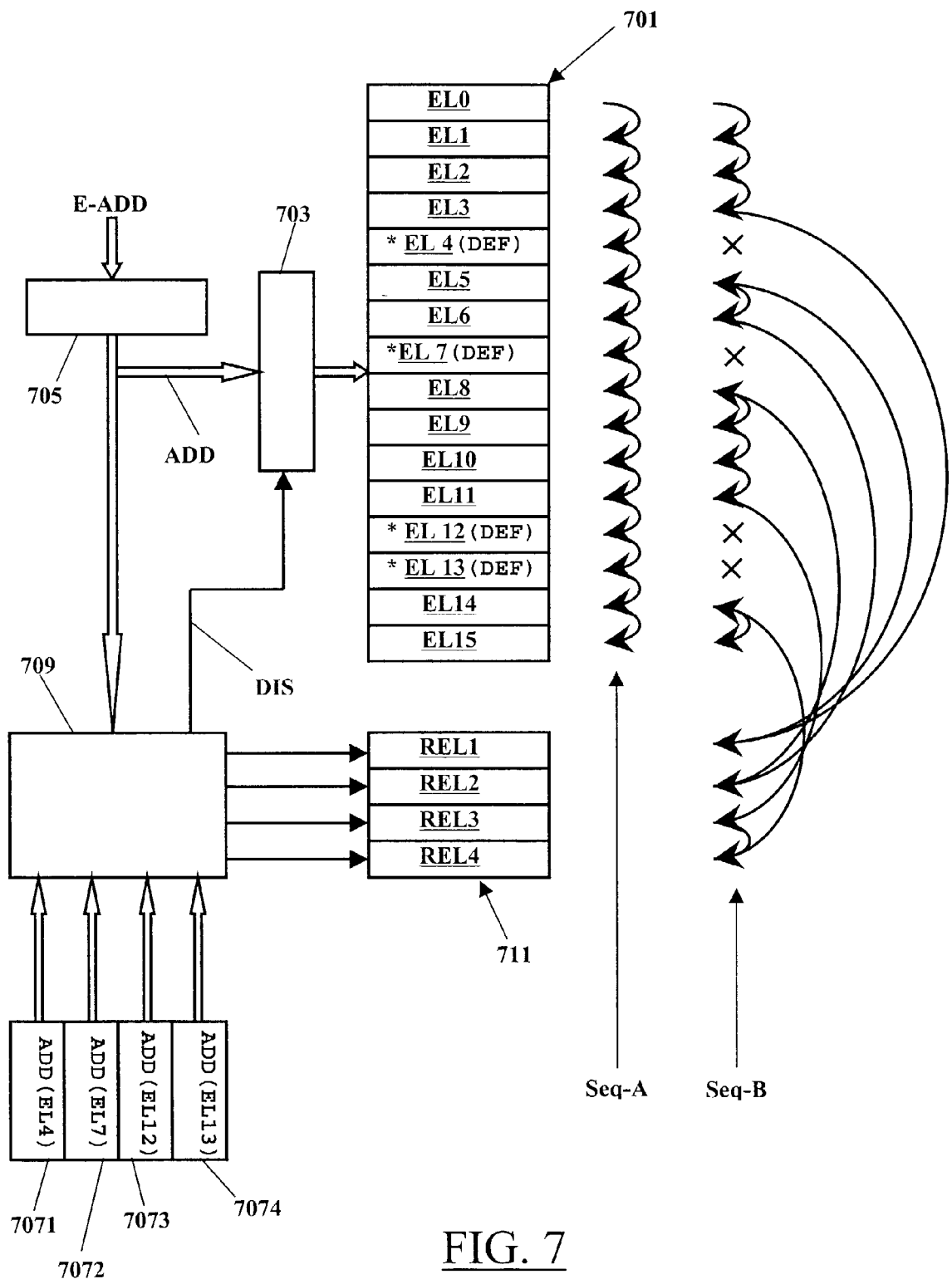
FIG. 7 shows schematically a conventional redundancy circuitry for a semiconductor memory.

FIG. 7 schematically shows a conventional redundancy circuitry for a semiconductor memory, such as a non-volatile memory (a mask ROM, an EPROM, a Flash memory or an EEPROM). Reference numeral 701 indicates the collection of elements of the memory, e.g. the memory cell rows or the memory cell columns; EL0 to EL15 indicate the individual memory elements; for simplicity, it is assumed that the memory includes only sixteen rows or sixteen columns. A selector circuit 703 is provided for selecting the memory elements EL0 to EL15 according to an address ADD (a binary code) fed thereto. The address ADD is provided by a counter 705, which can be loaded with an externally-supplied address E-ADD, externally supplied to the memory. The address ADD can be the externally-supplied address E-ADD, or be generated autonomously by the counter 705. The redundancy circuitry comprises a number (four, in the shown example) of registers 7071–7074 adapted to store addresses of defective elements in the collection 701 (in the following simply referred to as defective addresses). Each register 7071–7074 is associated with a respective redundant element REL1 to REL4 in a collection 711 of redundant elements (memory cell rows or columns, depending on the nature of the elements EL0 to EL15). A comparator circuit 709 receives and compares the address ADD and the defective addresses stored in the registers 7071–7074. If coincidence is detected between the address ADD and one of the defective addresses, the selector 703 is disabled (signal DIS), to prevent selection of the defective element, and one of the redundant elements REL1 to REL4 is accessed. In other words, the redundant elements are not selectable by the same selector circuit 703 that allows selecting the memory elements; in this sense, the redundant elements are external to the memory cell matrix (practically, they may be located at the edges of the memory cell matrix).

Let it be assumed that the sixteen elements EL0–EL15 in the collection 701 are to be accessed in sequence; the counter 705, starting from the address corresponding to the first element EL0, sequentially generates all the other addresses. A similar operation is for example carried out in a Flash memory during an erase phase, in which all the word lines are accessed for erasing the memory cells belonging thereto. If no defective elements exist, the elements EL0–EL15 are accessed in the sequence identified as Seq-A; if, on the contrary, defective elements are present, the access sequence will differ, for example in the way identified by Seq-B, where it has been assumed that the elements EL4, EL7, EL12 and EL13 are defective and are functionally replaced by the redundant elements REL1, REL2, REL3 and REL4, in this order. The addresses ADD(EL4), ADD(EL7), ADD(EL12) and ADD(EL13) of the defective elements EL4, EL7, EL12 and EL13 are written into the registers 7071, 7072, 7073 and 7074, respectively. The asterisks aside the defective elements EL4, EL7, EL12 and EL13 mean that the addresses of such elements are written into the registers 7071, 7072, 7073 and 7074.

This approach to the implementation of redundancy, albeit rather straightforward, shows drawbacks when a designer tries to implement it in particular types of memories.

This is in particular true for memories having the so-called "virtual ground" architecture, in which a peculiar bit line decoding scheme is implemented in which any bit line in the memory cell matrix may alternatively act as a source line or as a drain line. In this case, when a defective bit line is encountered, it is not possible to simply replace that bit line with a redundant bit line; normally, a whole packet of four or more bit lines adjacent to the defective one should be replaced. In addition to the waste of semiconductor area, it would be necessary to replicate a complex decoding scheme. For the above reasons, column redundancy is often not implemented in virtual ground memories.

These problems are exacerbated when particular memory cell sensing techniques are implemented, which require peculiar biasing schemes.

The above described problems are solved by a redundancy circuit such as the one schematically shown in FIG. 8, exploiting the pointer circuit according to the present invention.

In particular, the memory comprises in this case a collection 801 of elements EL0 to EL19 (for example, the bit lines of the memory cell matrix) including not only the memory elements EL0 to EL15, equivalent to the memory elements EL0 to EL15 in FIG. 7, but also additional memory elements EL16 to EL19, corresponding to the redundant elements REL1 to REL4 in FIG. 7, for functionally replacing up to four defective elements within the group of memory elements EL0 to EL15. Differently from the conventional solution schematically depicted in FIG. 7, both the memory elements EL0 to EL15 and the additional elements EL16 to EL19 are selectable by a common selector circuit 803, on the basis of an address S-ADD. The address S-ADD is generated by an adder 805, having the structure of the adder 109$i$ of FIG. 2, adding together a base address B-ADD provided by a counter 807 that can be loaded with an externally-supplied address E-ADD, and a binary-coded shift value SK-VAL provided by a shift control circuit 809.

In other words, the collection 801 of memory elements is expanded to include the additional memory elements necessary for implementing redundancy, and the selector circuit 803 is similarly expanded to support the addressability of the whole expanded collection of elements.

The shift control circuit 809 comprises a number of non-volatile registers 811-1 to 811-4 equal to the number of additional memory elements EL16 to EL19; each of the registers 811-1 to 811-4 is adapted to store an address of one of the memory elements EL0 to EL19, and can be associated with a respective defective element. The registers 811-1 to 811-4 feed an encoder 813, which is also fed by the base address B-ADD. The encoder 813 generates the binary-coded shift value SK-VAL that is fed to the adder 805.

The encoder 813 includes an address comparison section, comprising a number of majority detectors 815-1 to 815-4 equal to the number of registers 811-1 to 811-4. Each majority detector 815-1 to 815-4 receives the address value stored in a respective one of the registers 811-1 to 811-4, and the base address B-ADD. Each majority detector 815-1 to 815-4 generates a respective detector signal MJD-1 to MJD-4, which is asserted when the majority detector detects that the base address B-ADD is higher than the address stored in the associated registers 811-1 to 811-4. The detector signals MJD-1 to MJD-4 are fed to a multi-match encoder 817, establishing the binary-coded shift value SK-VAL on the basis of the detector signals MJD-1 to MJD-4 that from time to time are asserted.

In particular, the multi-match encoder 817 produces the binary-coded shift value only on the basis of the number of detector signals MJD-1 to MJD-4 that are simultaneously activated, irrespective of which particular detector signal is activated. In this case, it is not necessary to respect any prescribed relationship between the registers 811-1 to 811-4 and the order of the addresses stored therein. The multi-match encoder 817 translates into a binary-coded value the number of detector signals MJD-1 to MJD-4 that are simultaneously activated. Alternatively, the binary-coded shift value produced by the multi-match encoder 817 depends on which of the detector signals MJD-1 to MJD-4 are simultaneously activated; in this case, the addresses must be stored in the registers 811-1 to 8114 according to a prescribed relationship.

An encoder structure adapted to be used in this context is for example described in U.S. Pat. No. 6,696,990, which is incorporated by reference.

For example, let it be assumed that the elements EL4, EL7, EL12 and EL13 are found to be defective; the defectiveness of an element is typically assessed during a memory test phase after production.

Under this assumption, the following addresses are stored in the registers 811-1 to 811-4:

register 811-1: ADD(EL3)=ADD(EL4)−1=0011;

register 811-2: ADD(EL5)=ADD(EL7)−2=0110;

register 811-3: ADD(EL9)=ADD(EL12)−3=1001; and register 811-4: ADD(EL9)=ADD(EL13)−4=1001 (the same address as the address stored in register 811-3.

More generally, the address stored in a register is equal to the address of the corresponding defective element, less a value equal to the cumulated shift value to be applied to the base address for skipping the selection of the corresponding defective element. In addition, in case two or more adjacent defective elements exist, the address stored in all the registers associated with such defective elements is the same and equal to the lowest address calculated in the way just described.

Referring again to the example shown, for values of the base address B-ADD up to 0011 (ADD(EL3)), not higher than any one of the four addresses stored in the registers 811-1-811-4, none of the detector signals MJD-1 to MJD-4 is asserted. The multi-match encoder 817 determines that the shift value SK-VAL is zero, and the four elements EL0 to EL3 are normally accessed.

For values of the base address B-ADD higher than 0011, but not higher than 0101, only the detector signal MJD-1 is asserted. The multi-match encoder 817 determines that the correct binary-coded shift value SK-VAL is equal to 0001. This shift value, added to the base address, causes a shift of 1 (decimal) in the address S-ADD compared to the base address B-ADD. The elements EL4 and EL5 are re-mapped onto the elements EL5 and EL6. The defective element EL4 is therefore not accessed and skipped, and the element EL5 is instead accessed: the element EL5 functionally replace the defective element EL4.

For base address values higher than 0101, but not higher than 1001, the two detector signals MJD-1 and MJD-2 are asserted. The multi-match encoder 817 determines that the correct binary-coded shift value SK-VAL is equal to 0010. This shift value, added to the base address, causes a shift of 2 in the address S-ADD compared to the base address B-ADD. The elements EL6 to EL9 are re-mapped onto the elements EL8 to EL11. The defective element EL7, onto which the element EL6 would be re-mapped in consequence of the shift value of 1, is thus not accessed.

For base address values higher than 1001, the four detector signals MJD-1, MJD-2, MJD-3 and MJD-4 are asserted. The multi-match encoder 817 determines that the correct binary-coded shift value SK-VAL is equal to 0100. This shift value, added to the base address, causes a shift of 4 in the address S-ADD compared to the base address B-ADD. The defective elements EL12 and EL13 are thus properly skipped; the elements EL10 to EL15 are re-mapped onto the elements EL14 to EL19.

The progression of the binary-coded shift value SK-VAL is thus 0000, 0001, 0010, 0100 or, expressed in decimal notation, 0, 1, 2, 4.

In FIG. 8, Seq-A denotes the natural access sequence to the memory elements, if no defective elements exist; Seq-B is the access sequence consequent to the re-mapping due to the presence of defective elements.

In other words, the presence of defective elements determines a re-mapping of the elements onto other elements in the collection. If more than one defective elements exist, the re-mapping is incremental. The majority detectors 815-1 to 815-4 allow to detect when a skip is required, remain active as long as the current base address is higher than the address stored in the associated register 811-1 to 811-4 and immediately deactivate as soon as this condition is no longer verified. The multi-match encoder 817 easily determines the proper shift value to be added to the base address. The adder 805 easily calculates the shifted address value.

It can be appreciated that the address shifting scheme preserve a one-to-one relationship between the element pointed to by the base address B-ADD and the element pointed to by the address S-ADD, both in the case of a progressive scan of the elements in the collection, and in the case of a random access to a generic element.

The dimension, in terms of number of bits, of the bus carrying the shift value SK-VAL depends on the maximum allowable binary-coded shift value, i.e., on the number of additional elements provided in the collection compared to the memory elements that can be addressable by means of the base address. In general, the number of bits of the binary-coded shift value SK-VAL can range from one to the number of bits of the base address B-ADD.

The memory matrix and the selector structures feature a high degree of regularity, continuity and compactness; this has a beneficial impact on the layout of these structures.

Any element in the collection may be used to functionally replace a defective element. There is no physical distinction between regular elements and redundant elements. Also, an element used to functionally replace another defective element, if found to be defective, can be in turn functionally replaced by another element.

These features are particularly useful in virtual-ground memory matrices, because the number of additional elements can be kept low, and the decoding structures are simple.

The structure schematically shown in FIG. 8, relating for simplicity to a single-bank memory, can be easily extended to multi-bank memories in the way shown in FIG. 1A: each memory bank is an independent collection of elements, and is associated with a respective shift control circuit 809 and a respective adder 805.

Although the present invention has been disclosed and described by way of some embodiments, it is apparent to those skilled in the art that several modifications to the described embodiments, as well as other embodiments of the present invention are possible without departing from the scope of the invention as defined in the appended claims.

What is claimed is:

1. A pointer circuit for pointing to elements in at least one collection of elements, comprising:
   a base pointer adapted to provide a first binary-coded value defining a first address corresponding to an element in the collection;
   a binary shift circuit receiving the first binary-coded value provided by the base pointer and a second binary-coded value defining a shift value,
   the binary shift circuit combining the first and second binary-coded values to provide a third binary-coded value defining a second address corresponding to an element in the collection, the second address differing from the first address by the shift value; and
   a control sub-system fed by the first binary-coded value and generating the second binary-coded value depending on the first binary-coded value, in such a way that a generated shift value takes into account shift values corresponding to first binary-coded values preceding a current first binary-coded value in a prescribed first binary-coded value progression order.

2. The pointer circuit according to claim 1, in which the binary shift circuit comprises a binary adder, performing a binary addition between the first binary-coded value and the second binary-coded value.

3. The pointer circuit according to claim 2, in which the first binary-coded value includes a first number of bits, and the second binary-coded value includes a second number of bits ranging from one to the first number of bits.

4. The pointer circuit according to claim 3, in which the third binary-coded value includes a third number of bits equal to the first number of bits plus one.

5. The pointer circuit according to claim 4, in which a number of elements of the collection that can be individually pointed to by means of the third binary-coded value is higher than a number of elements which can be individually pointed to by means of the first binary-coded value.

6. The pointer circuit according to claim 2, in which the base pointer comprises a binary register adapted to receiving and storing a fourth binary-coded value defining the first address, the binary register having a plurality of register cells each one storing a respective bit of the fourth binary-coded value.

7. The pointer circuit according to claim 6, in which the base pointer comprises a binary counter having a plurality of counter stages each one providing a respective bit of the first binary-coded value.

8. The pointer circuit according to claim 6, in which the binary adder comprises a number of binary adder stages at least equal to the number of register cells or counter stages.

9. The pointer circuit according to claim 8, in which a first group of the binary adder stages receives the second binary-coded value and performs a binary addition of the first address and of the shift value, and a second group of binary adder stages propagates a carry resulting from the binary addition.

10. An electronic system comprising:
   at least two sub-systems, each one comprising at least one respective collection of elements;
   a base pointer generating a first binary-coded value;
   at least two binary shift circuits, each one associated with a respective sub-system and receiving the first binary-coded value; and
   a control sub-system for feeding each binary shift circuit with a respective second binary-coded value defining a respective shift value,
   the control sub-system being fed by the first binary-coded value and generating the second binary-coded values depending on the first binary-coded value, in such a way that a generated shift value takes into account shift values corresponding to first binary-coded values preceding a current first binary-coded value in a prescribed first binary-coded value progression order,
   the binary shift circuits combining the first binary-coded value and the respective second binary-coded value to provide a respective third binary-coded value defining an address of an element in the respective collection of elements differing by the respective shift value from an address defined by the first binary-coded value.

11. The electronic system according to claim 10, in which the collections of elements include each a number of elements higher than a number of elements which can be individually pointed to by the base pointer.

12. The electronic system according to claim 10, in which the control sub-system is programmable to specify binary shift values to be supplied to each binary shift circuit in dependence of the first binary-coded value.

13. The electronic system according to claim 10, in which there is a one-to-one correspondence between the third binary-coded value and the elements in the respective collection.

14. A memory comprising:
   at least one collection of memory elements, including a first sub-set of memory elements addressable by means of a first binary-coded address, and a second sub-set of additional memory elements;
   a selector circuit for individually selecting the elements in the collection according to a second binary-coded address;
   a shift circuit for generating the second address combining the first binary-coded address with a binary-coded shift value;
   an encoder circuit fed by the first binary-coded address for generating the shift value, the shift value depending on the first binary-coded address, a generated shift value taking into account shift values corresponding to binary-coded first address values preceding a current binary-coded first address value in a prescribed binary-coded first address progression order.

15. The memory according to claim 14, in which said additional memory elements follow the memory elements in the first sub-set in said prescribed binary-coded first address progression order.

16. The memory according to claim 15, in which the encoder circuit determines the shift value by comparing the first address to a set of predetermined first address values including at least one predetermined first address value.

17. The memory according to claim 16, in which said at least one predetermined first address value provides an indication of a memory element to be skipped in the first sub-set of memory elements.

18. The memory according to claim 17, in which said at least one predetermined first address value is equal to a first address value corresponding to the memory element to be skipped, less a value equal to a shift value to be applied to the first address value for skipping that memory element.

19. The memory according to claim 18, in which the encoder circuit comprises at least one majority detector for detecting whether the first address is higher than the at least one predetermined first address value.

20. The memory according to claim 19, in which the encoder circuit comprises an encoder circuit for generating the shift value depending on activation state of the at least one majority detector.

21. The memory according to claim 20, in which the encoder circuit comprises two or more majority detectors, the encoder circuit generating the shift value depending on a simultaneous activation state of the two or more majority detectors.

22. The memory according to claim 21, in which the generated shift value is a binary-coded version of a number indicating how many majority detectors are simultaneously activated.

23. The memory according to claim 17, in which the memory element to be skipped is a defective memory element.

24. The memory according to claim 14, in which the binary-coded shift value includes a number of bits ranging from one to a number of bits of the binary-coded first address.

25. The memory according to claim 14, in which said memory elements are lines of a matrix of memory cells, particularly bit lines or word lines.

26. A method, comprising:
   receiving an address of a defective memory location within a sequence of memory locations;
   generating an offset from the address of the defective memory location;
   combining the offset and the address to generate a shifted address; and
   addressing with the shifted address a functional memory location within the sequence in response to the address of the defective memory location.

27. The method of claim 26 wherein the sequence of memory locations composes a row of memory locations.

28. The method of claim 26 wherein the sequence of memory locations composes a column of memory locations.

29. The method of claim 26 wherein combining the offset and the address comprises summing the offset and the address to generate the shifted address.

30. A method, comprising:
   receiving an address of a memory location that is part of a sequence of defective and functional memory locations;
   generating an offset from the received address, the offset having a value equal to the number of defective memory locations with addresses lower than the sum of the received address and the offset;
   generating a shifted address from the offset and the received address; and
   addressing a functional one of the memory locations with the shifted address.

31. The method of claim 30 wherein generating the offset comprises:
   comparing the received address to the respective differences between the addresses of the defective memory locations and the number of defective memory locations having addresses lower than or equal to the respective addresses of the defective memory locations; and
   generating the offset equal to the number of the respective differences that the received address is greater than.

32. The method of claim 30 wherein generating the shifted address comprises generating the shifted address equal to the sum of the offset and the received address.

* * * * *